US011784878B2

(12) United States Patent
Torres et al.

(10) Patent No.: US 11,784,878 B2
(45) Date of Patent: Oct. 10, 2023

(54) NETWORK DEVICE SUPPORTING MULTIPLE OPERATING SYSTEMS TO ENABLE OPTIMIZED USE OF NETWORK DEVICE HARDWARE

(71) Applicant: Arista Networks, Inc., Santa Clara, CA (US)

(72) Inventors: Gil Adrian Torres, San Francisco, CA (US); Samuel Angebault, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/841,852

(22) Filed: Jun. 16, 2022

(65) Prior Publication Data

US 2022/0311667 A1    Sep. 29, 2022

Related U.S. Application Data

(63) Continuation of application No. 17/135,442, filed on Dec. 28, 2020, now Pat. No. 11,394,614.

(60) Provisional application No. 63/020,502, filed on May 5, 2020.

(51) Int. Cl.
*H04L 41/0823* (2022.01)
*H04L 41/0893* (2022.01)
*H04L 41/0859* (2022.01)
*H04L 41/082* (2022.01)

(52) U.S. Cl.
CPC ........ *H04L 41/0823* (2013.01); *H04L 41/082* (2013.01); *H04L 41/0859* (2013.01); *H04L 41/0893* (2013.01)

(58) Field of Classification Search
CPC ............... H04L 41/082; H04L 41/0823; H04L 41/0859; H04L 41/0893
USPC ........................................................ 709/223
See application file for complete search history.

(56) References Cited

U.S. PATENT DOCUMENTS

| 8,572,610 | B2 | 10/2013 | Davis |
| 8,762,999 | B2 | 6/2014 | Johnson et al. |
| 9,336,036 | B2 | 5/2016 | Dong et al. |
| 10,496,547 | B1 * | 12/2019 | Naenko ............... G06F 9/45558 |

(Continued)

FOREIGN PATENT DOCUMENTS

JP        2001022598 A    1/2001

OTHER PUBLICATIONS

Internationl Searching Authority, International Search Report & Written Opinion, PCT App. No. PCT/US2021/020091, dated Jun. 22, 2021, 12 pages.

*Primary Examiner* — David P Zarka
(74) *Attorney, Agent, or Firm* — Fountainhead Law Group P.C.

(57) ABSTRACT

A method for managing a network device that includes a network operating system (NOS) and a third-party network operating system (3PNOS) includes detecting a 3PNOS state change in a 3PNOS database managed by the 3PNOS, translating the 3PNOS state change into a network device state change, storing the network device state change in a state database managed by the NOS, in response to the storing: detecting a change in the state database by a NOS agent executing in the NOS, initiating, in response to detecting the change in the state database, an update to hardware on the network device by the NOS, wherein the 3PNOS does not directly manage the hardware.

20 Claims, 7 Drawing Sheets

(56) References Cited

U.S. PATENT DOCUMENTS

| | | | |
|---|---|---|---|
| 10,628,317 B1* | 4/2020 | Zelenov | G06F 16/172 |
| 11,394,614 B2* | 7/2022 | Torres | H04L 41/0823 |
| 11,436,141 B2* | 9/2022 | Hildenbrand | G06F 9/45558 |
| 2006/0281556 A1 | 12/2006 | Solomon et al. | |
| 2006/0294519 A1 | 12/2006 | Hattori et al. | |
| 2011/0138147 A1* | 6/2011 | Knowles | G06F 9/5016 |
| | | | 711/170 |
| 2011/0265083 A1* | 10/2011 | Davis | G06F 12/0866 |
| | | | 718/1 |
| 2019/0004865 A1* | 1/2019 | Ivanov | G06F 9/44536 |
| 2019/0228401 A1 | 7/2019 | Ricket et al. | |
| 2021/0004254 A1* | 1/2021 | Tateno | G06F 9/5061 |

* cited by examiner

NETWORK DEVICE SUPPORTING MULTIPLE OPERATING SYSTEMS TO ENABLE OPTIMIZED USE OF NETWORK DEVICE HARDWARE

CROSS-REFERENCE TO RELATED APPLICATIONS

This application benefits under 35 USC § 119 to U.S. Provisional Application No. 63/020,502 filed on May 5, 2020. U.S. Provisional Application No. 63/020,502 is hereby incorporated by reference in its entirety. This application is a continuation of U.S. application Ser. No. 17/135,442 filed Dec. 28, 2020, now U.S. Pat. No. 11,394,614.

BACKGROUND

Network devices implement network operating systems that are specifically designed to communicate with hardware (e.g., network hardware) in the network devices. Further, as the hardware changes, the network operating system is updated to be able to interact with the new updated hardware. However, third-party components in the network device may lack the ability to interact directly with the hardware without modifications performed to the third-party components.

DETAILED DESCRIPTION

Third parties have started to develop network operating systems (3PNOS) that are designed to run on a variety of network devices. The 3PNOS allows users to rapidly add features to the 3PNOS. In many cases, a 3PNOS is part of an open source project and, as such, there are a significant number of developers working to implement new/updated features in the 3PNOS. However, in order to utilize the 3PNOS on a given network device, a user would have to customize portions of the 3PNOS such that the 3PNOS can properly interact with the specific hardware on the network device. This customization is complex and requires a significant amount of technical knowledge and resources.

Embodiments of the disclosure address the aforementioned problem by providing a translation mechanism (e.g., the Network Device Abstract Interface (NDAI) Management Container). The NDAI management container enables a single network device to concurrently execute the 3PNOS and an NOS and provides a mechanism to implement the functionality of the 3PNOS in the underlying hardware of the network device. In this manner, network administrators may interact with the network device using the 3PNOS. The 3PNOS, in turn, will interact, via the NDAI management container, with the NOS. The NOS will then manage the communication with the network device hardware. In this manner, the complexity related to interacting with the network device hardware is maintained within the NOS and the administrators that are managing the network device only need to be concerned about their interaction with the 3PNOS. Said another way, the interaction between the 3PNOS and the network device hardware is hidden from the administrator by the NDAI management container.

More specifically, in various embodiments of the disclosure, the 3PNOS stores data in its 3PNOS database. The NDAI management container (or, more specifically, the interface agent executing therein) monitors the 3PNOS database and, if there is a change, obtains the changed data, and translates the changed data. The interface Agent stores the translated changed data in the appropriate location in the NOS state database. The storage of the data in the NOS state database initiates the processing of this data, which may ultimately result in an NOS agent initiating the programming of the network device hardware (e.g., an ASIC).

Various embodiments of the disclosure are described below.

Figure 1A:
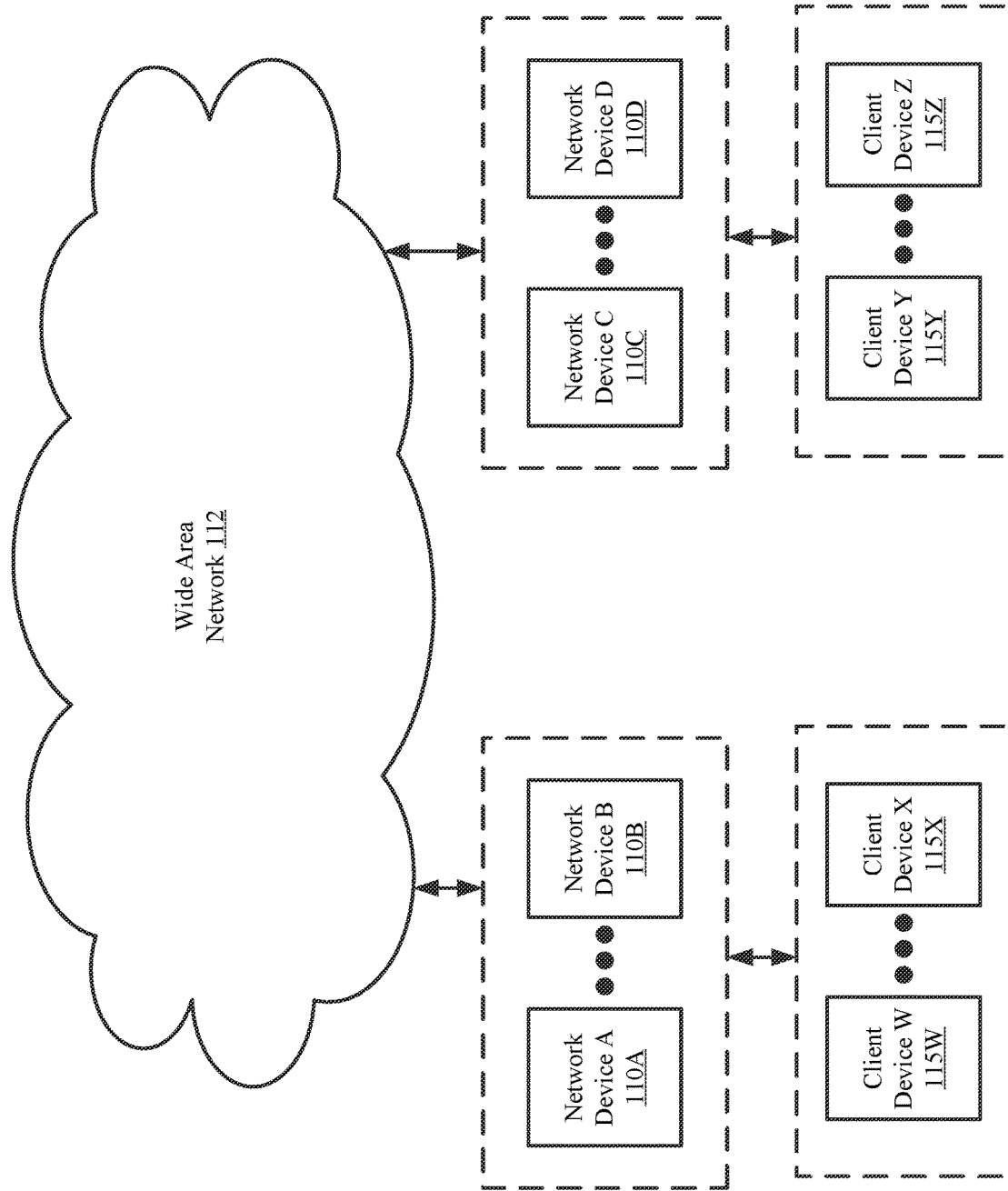
FIG. 1A shows a diagram of a system in accordance with one or more embodiments.

FIG. 1A shows a system in accordance with one or more embodiments of the disclosure. As shown in FIG. 1A, the system includes one or more network devices (110A, 110B, 110C, 110D) and client devices (115W, 115X, 115Y, and 115Z) all connected within a wide area network (112). Each of these components is operatively connected via any combination of wired and/or wireless connections without departing from the disclosure. The system may include additional, fewer, and/or different components without departing from the disclosure. Each of the aforementioned components illustrated in FIG. 1A is described below.

In one or more embodiments, each of the network devices (e.g., 110A, 110B, 110C, 110D) includes functionality to receive network traffic data units (e.g., frames, packets, tunneling protocol frames, etc.) at any of the physical network interfaces (e.g., ports) of the network device and to process the network traffic data units. In one or more embodiments, the network device includes functionality for transmitting data between network devices (110A, 110B, 110C, 110D) and/or between components in a network device (110A, 110B, 110C, 110D). The process of receiving network traffic data units, processing the network traffic data units, and transmitting the network traffic data units may be in accordance with, at least in part, instructions issued by a client (e.g., 115W, 115X, 115Y, and 115Z).

In one embodiment of the disclosure, the one or more network device(s) (110A, 110B, 110C, 110D) are physical devices (not shown) that include persistent storage, memory (e.g., random access memory), one or more processor(s) (including a switch chip, which is in the network device hardware layer (e.g., FIG. 1B, 140), described below), and two or more physical ports. In one embodiment of the disclosure, the switch chip is hardware that determines which egress port on a network device to forward media access control (MAC) frames. The switch chip may include egress and ingress ports that may connect to ports on the network device. Each port may or may not be connected to another device (e.g., a client device, another network device) on a network device on the wide area network (112) (e.g., a server, a switch, a router, etc.). The network device may be configured to receive packets via the ports and determine whether to: (i) drop the packet; (ii) process the packet in accordance with one or more embodiments of the disclosure; and/or (iii) send the packet, based on the processing, out another port on the network device. While the aforementioned description is directed to network devices that support Ethernet communication, the disclosure is not limited to Ethernet; rather, the disclosure may be applied to network devices using other communication protocols. For additional details regarding a network device (110A, 110B, 110C, 110D), see, e.g., FIG. 1B.

In one embodiment of the disclosure, the one or more clients (115W, 115X, 115Y, and 115Z) may each be a computing device (see e.g., FIG. 4) or virtual instance that is configured to interact with the network devices. In one embodiment of the disclosure, a client (e.g., 115W, 115X, 115Y, and 115Z) includes functionality to send commands (e.g., instructions) to a third-party network operating system (3PNOS) operating in a network device (110A, 110B, 110C, 110D). The 3PNOS (discussed below in FIG. 1B) may process the commands using 3PNOS agents operating in the 3PNOS. Additional detail about the operation of the 3PNOS is described in, e.g., FIG. 2A.

Figure 1B:
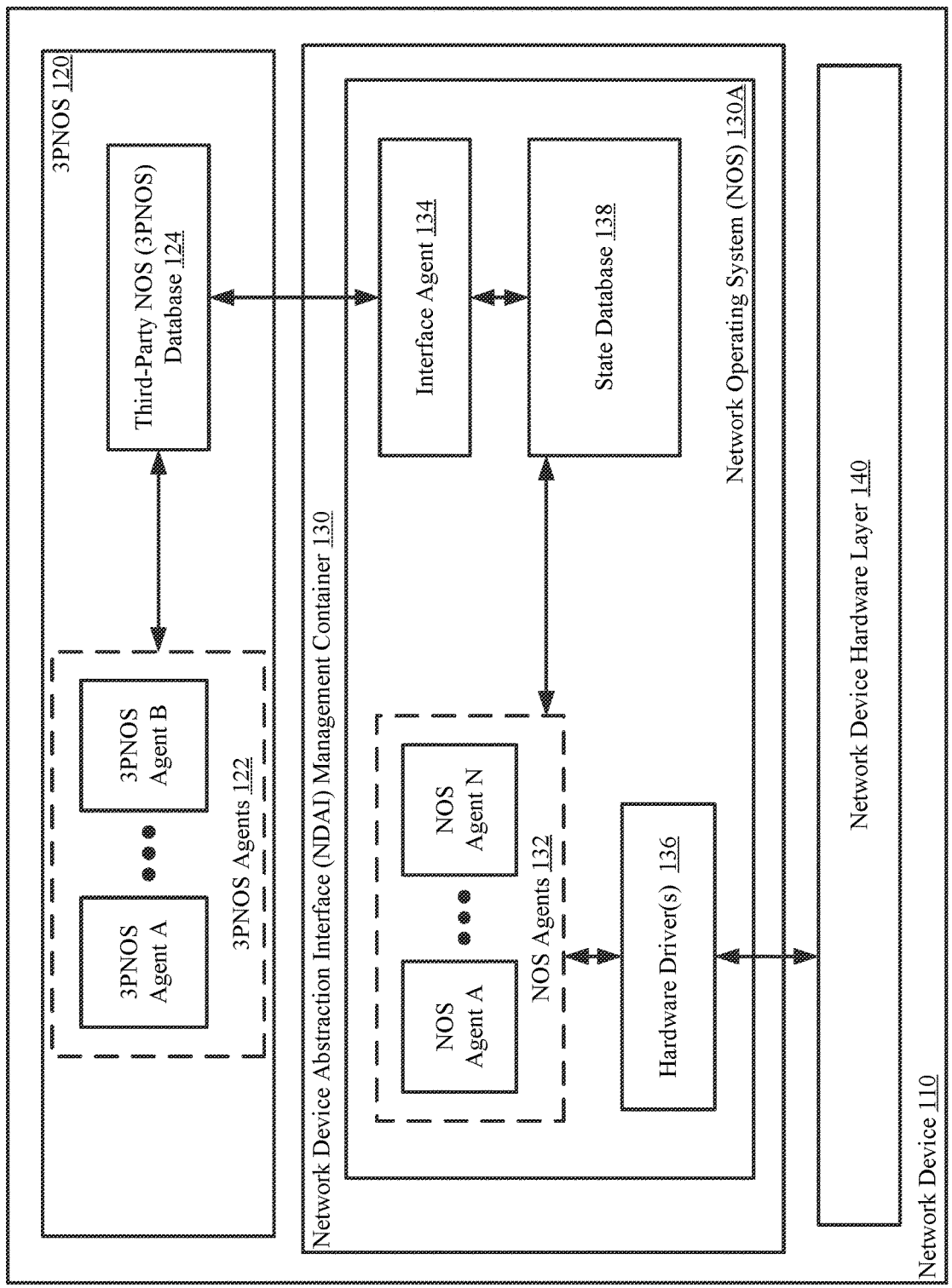
FIG. 1B shows a diagram of a network device in accordance with one or more embodiments.

FIG. 1B shows a network device in accordance with one or more embodiments of the disclosure. The network device (110) may be an embodiment of a network device (110A, 110B, 110C, 110D, FIG. 1A) discussed above. As discussed above, the network device (110) may include functionality for transmitting data between network devices and/or between components in the network device (110). To perform the aforementioned functionality, the network device (110) includes a 3PNOS (120), a network device abstraction interface (NDAI) management container (130), which hosts a network operating system (NOS) (130A), and a network device hardware layer (140). The network device (110) may include additional, fewer, and/or different components without departing from the disclosure. Each of the aforementioned components illustrated in FIG. 1B is described below.

In one embodiment of the disclosure, the 3PNOS (120) is an operating system that includes functionality to manage the operation of the network device (110). This functionality may include the software components (or modules) required to implement layer three packet processing. For example, the 3PNOS (120) includes functionality to support the network device's operation as a layer three switch. The 3PNOS (120) may include other and/or different functionality without departing from the disclosure. Additionally, the functionality may include the software components (or modules) required to implement layer two (L2) packet processing. The software components (or modules) implementing the L2 packet processing may implement required protocols (e.g., LAG, LLDP, etc.) to implement the packet processing.

In one embodiment of the disclosure, the 3PNOS (120) is configured to interact with the NOS (130A) instead of the network device hardware layer. Said another way, traditional configurations of the 3PNOS enable the 3PNOS to directly interact with the network device hardware layer (e.g., 140) (i.e., there is no NOS (or other abstraction layer) interposed between the 3PNOS and the network device hardware layer).

While the 3PNOS does not interact directly with the network device hardware layer, the 3PNOS (120) may interact directly with client devices (discussed above) and/or other network devices to receive 3PNOS state changes. Thus, for example, a network administrator may interact directly with the 3PNOS (120) in order to manage the network device and may not be aware that the 3PNOS (120) is interacting with the NOS (which ultimately implements any configuration and/or changes requested by the network administrator).

Continuing with the discussion of FIG. 1B, the 3PNOS state changes may be stored in a 3PNOS database (124) of the 3PNOS (120) via one or more 3PNOS agents (122) executing on the 3PNOS (120).

In one embodiment of the disclosure, the one or more 3PNOS agents (122) interact with the 3PNOS database (124). Each 3PNOS agent facilitates the implementation of one or more protocols, services, and/or features of the 3PNOS (120). Examples of protocols include, but are not limited to, MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, and IGMP. Furthermore, each 3PNOS agent includes functionality to access various portions of the 3PNOS database (124) in order to obtain the relevant portions of the state of the network device in order to perform various functions. Additionally, each 3PNOS agent includes functionality to update the state of the network device (110) by writing new and/or updated values in the 3PNOS database (124).

In one embodiment of the disclosure, the new and/or updated values in the 3PNOS database (124) as stored by the 3PNOS agents (122) are written in a first format. The first format may be a format that is not readable by the NOS (130A) without an interface agent (134).

In one embodiment of the disclosure, the 3PNOS database (124) may be implemented using any type of database (e.g., a relational database, a distributed database, a cluster of multiple databases, etc.). Further, the 3PNOS database (124) may be implemented in-memory (i.e., the contents of the 3PNOS database (124) may be maintained in volatile memory). Alternatively, the 3PNOS database (124) may be implemented using persistent storage. In another embodiment of the disclosure, the 3PNOS database (124) may be implemented as an in-memory database with a copy of the 3PNOS database (124) being stored in persistent storage. In such cases, as changes are made to the in-memory database, copies of the changes (with a timestamp) may be stored in persistent storage. The use of an in-memory database may provide faster access to the contents of the 3PNOS database (124).

In one embodiment of the disclosure, the 3PNOS database (124) includes the current state of the network device (110) from the perspective of the 3PNOS (120). Specifically, as discussed below, changes to the 3PNOS database (124) may be performed prior to the state database (138) (discussed below) being updated (see e.g., FIGS. 2A-2B). Further, changes to the state database (138) may also be performed prior to the 3PNOS database being updated (see e.g., FIG. 2B).

The state information stored in the 3PNOS database (124) may include, but is not limited to: (i) information about (and/or generated by) all (or a portion of the) services currently executing on the network device; (ii) the version of all (or a portion of the) software executing on the network device; (iii) the version of all firmware on the network device; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, and (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the disclosure, the 3PNOS database includes control plane state information associated with the control plane of the network device. Further, in one embodiment of the disclosure, the state database includes data plane state information associated with the data plane of the network device. The 3PNOS database may include other information without departing from the disclosure.

In one embodiment of the disclosure, the NDAI management container (130) is an isolated execution environment in which the NOS is executing. By using the NDAI management container (130), the NOS (130A) is isolated from the 3PNOS (120). Thus, the 3PNOS (120) and the NOS (130A) can concurrently and independently execute on the network device. While the 3PNOS (120) and the NOS (130A) are independently executing, they are able to interact using the interface agent (134).

Figure 1C:
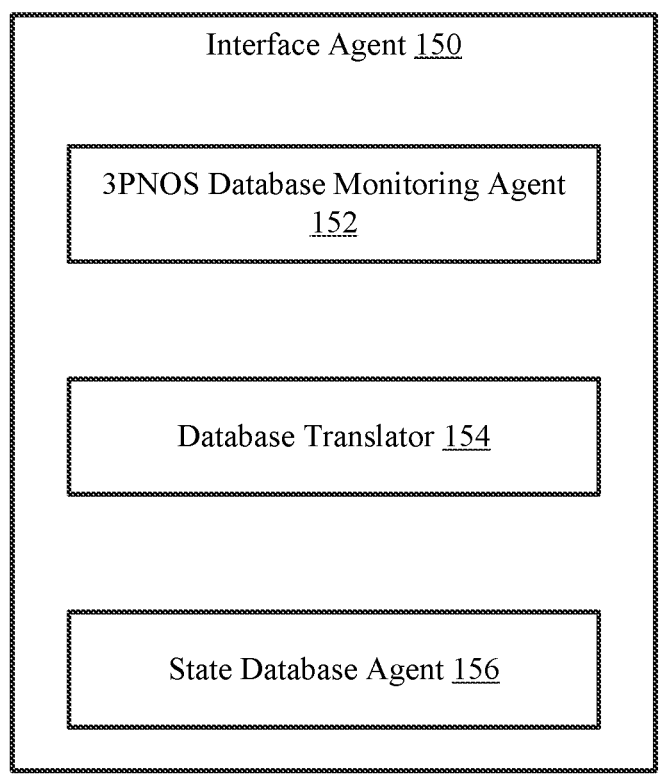
FIG. 1C shows a diagram of an interface agent in accordance with one or more embodiments.
Figure 2A:
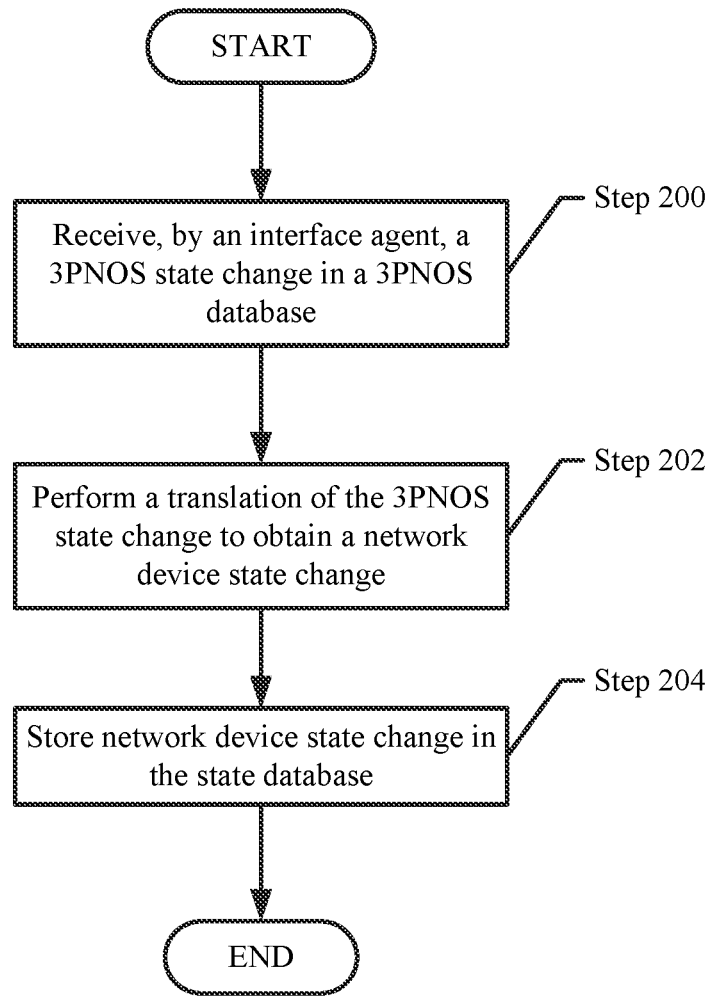
FIG. 2A shows a flowchart for a method for monitoring and processing 3PNOS state changes in a 3PNOS database from the perspective of the interface agent in accordance with one or more embodiments.

The interface agent (134) may include functionality for monitoring the 3PNOS database (124) in accordance with FIG. 2A. Further, the interface agent (134) includes functionality for storing network device state changes translated from the first format to a second format. In one embodiment of the disclosure, the second format is a format readable by NOS agents (132) executing in the NOS (130A). For additional details regarding the interface agent (134), see, e.g., FIG. 1C.

In one embodiment of the disclosure, the NDAI management container (130) further includes one or more NOS agents (132). The NOS agents (132) interact with the state database (138). Each NOS agent facilitates the implementation of one or more protocols, services, and/or features of the network device (110). Examples of NOS agents, include, but are not limited to, a routing information base agent, a forwarding information base agent, and a simple network management protocol (SNMP) agent. Furthermore, each NOS agent includes functionality to access various portions of the state database (138) in order to obtain the relevant portions of the state of the network device in order to perform various functions. Additionally, each network device agent includes functionality to update the state of the network device by writing new and/or updated values in the state database (138), corresponding to one or more variables and/or parameters that are currently specified in the network device. The NOS agents (132) may process network device state changes in accordance with FIG. 2B.

In one or more embodiments of the disclosure, the NOS agents (132) include functionality for, collectively, performing multiple processes in response to network device state changes. The multiple processes may be initiated by the NOS agents (132) by sending commands to the hardware drivers (136) that execute the processes on the network device hardware layer. In one or more embodiments of the disclosure, the NOS agents (132) may each initiate one or more of the processes in accordance with the network device state changes discussed below in FIGS. 2A-2B.

In one embodiment of the disclosure, the state database (138) includes the current state of the network device (110) from the perspective of the NOS. The state information stored in the state database may include, but is not limited to: (i) information about (and/or generated by) all (or a portion of the) services currently executing on the network device; (ii) the version of all (or a portion of the) software executing on the network device; (iii) the version of all firmware on the network device; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, and (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the disclosure, the state database includes control plane state information (discussed above) associated with the control plane of the network device. Further, in one embodiment of the disclosure, the state database includes data plane state information (discussed above) associated with the data plane of the network device. The state database may include other information without departing from the disclosure.

In one embodiment of the disclosure, the state database (138) may be implemented using any type of database (e.g., a relational database, a distributed database, etc.). Further, the state database may be implemented in-memory (i.e., the contents of the state database may be maintained in volatile memory). Alternatively, the state database may be implemented using persistent storage. In another embodiment of the disclosure, the state database may be implemented as an in-memory database with a copy of the state database being stored in persistent storage. In such cases, as changes are made to the in-memory database, copies of the changes (with a timestamp) may be stored in persistent storage. The use of an in-memory database may provide faster access to the contents of the state database.

Those skilled in the art will appreciate that while the term "database" is used above, the state database (138) may be implemented using any known or later developed data structure(s) to manage and/or organize the content in the state database.

In one embodiment of the disclosure, the hardware drivers (136) are drivers equipped to execute commands on the hardware in the network device hardware layer (140) in accordance with processes initiated by the NOS agents (132).

In one embodiment of the disclosure, the network device hardware layer (140) includes a set of hardware devices that execute processes. The processes may be processes initiated by the NOS agents (132). The network device hardware layer (140) may include application-specific integrated circuits (ASICs) (and/or general purpose and or special purpose hardware devices (e.g., field-programmable gate-arrays (FPGAs)) configured to process packets (as discussed above) received by the network device via its ports.

While the NDAI management container (130) is illustrated to include all components of the NOS (130A), any combination of isolated execution environments (e.g., a container, a virtual machine, etc.) may be utilized to execute or include any or all portions of the NOS (130A). In one embodiment, a container is an isolated user space that executes on a kernel of an operating system (e.g., Docker containers). For example, the interface agent (134) may be in a first container, and the NOS agents (132), the hardware drivers (136), and the state database (138) may be in a second container. Any other combinations of containers may be used to execute the components of the NOS (130A) without departing from the disclosure. Further, though not shown, the 3PNOS (120) may also be executing in its own isolated execution environment, which may be a container, a virtual machine, or any other isolated execution environment.

FIG. 1C shows an interface agent (150) in accordance with one or more embodiments of the disclosure. The interface agent (150) may be an embodiment of the interface agent (134, FIG. 1B) discussed above. As discussed above, the interface agent (150) may include functionality for storing network device state changes translated from a first format to a second format. To perform the aforementioned functionality, the interface agent (150) includes a 3PNOS database monitoring agent (152), a database translator (154), and a state database agent (156). The interface agent (150) may include additional, fewer, and/or different components without departing from the disclosure. Each of the components of the interface agent (150) illustrated in FIG. 1C is discussed below.

In one embodiment of the disclosure, the 3PNOS database monitoring agent (152) is an agent that includes functionality for monitoring the 3PNOS database (124, FIG. 1B) illustrated above. The 3PNOS database monitoring agent (152) may monitor for any 3PNOS state changes updated by the 3PNOS agents. Any 3PNOS state changes may be obtained (via a push or pull mechanism) by the 3PNOS database monitoring agent (152) and provided to the database translator (154) as described in FIG. 2A.

In one embodiment of the disclosure, the database translator (154) includes functionality for translating 3PNOS state changes obtained from the 3PNOS database. The 3PNOS changes may be translated from a first format to a second format (as discussed in FIG. 2A). The result of the translation into the second format is a network device state change (which may be stored in the state database). The database translator (154) may further include functionality for providing the network device state change to the state database agent (156).

In one embodiment of the disclosure, the state database agent (156) includes functionality for storing network device state changes generated by the database translator (154) in a state database (138, FIG. 1B). Specifically, the state database agent (156) may include functionality to update the state of the network device by writing new and/or updated values in the state database, corresponding to one or more variables and/or parameters that are currently specified in the network device state change. In one embodiment of the disclosure, the state database agent (156) may further include functionality to identify changes in the state database and providing the changes to the database translator (154) to be translated to the first format of the 3PNOS database and then provided to the 3PNOS.

FIG. 2A shows a flowchart for a method for monitoring and processing 3PNOS state changes in a 3PNOS database in accordance with one or more embodiments described herein. The method of FIG. 2A may be performed by, for example, an interface agent (e.g., 150, FIG. 1C). Other components illustrated in FIGS. 1A-1C may perform the method of FIG. 2A without departing from the disclosure. Further, one or more steps in FIG. 2A may be performed concurrently with one or more steps in FIGS. 2A-2B.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a 3PNOS state change in a 3PNOS is obtained. In one embodiment of the disclosure, the 3PNOS state change is received in response to a monitoring performed on a 3PNOS database. A 3PNOS state change may be obtained from the 3PNOS database. The 3PNOS state change may be in a first format.

The 3PNOS state change may specify performing an update, initiating one or more processes, and/or initiating commands to hardware in the network device hardware layer. The 3PNOS state change may specify other commands and/or processes without departing from the disclosure. The 3PNOS state change may be the result of a command or instruction issued by a user (e.g., a network administrator) and then processed by an appropriate 3PNOS agent to generate the resulting 3PNOS state change. The disclosure is not limited to the aforementioned example.

In step 202, a translation of the 3PNOS state change is performed to obtain a network device state change. The translation may include identifying a first format of the 3PNOS state change, identifying a second format of the state database to which the network device state change is being stored, and generating the network device state change in the second format. The resulting network device state change corresponds to the 3PNOS state change.

In step 204, the network device state change is stored in the state database (138, FIG. 1B). In one embodiment of the disclosure, the change is stored by storing and/or otherwise modifying data corresponding to the network device state change obtained in step 202.

Figure 2B:
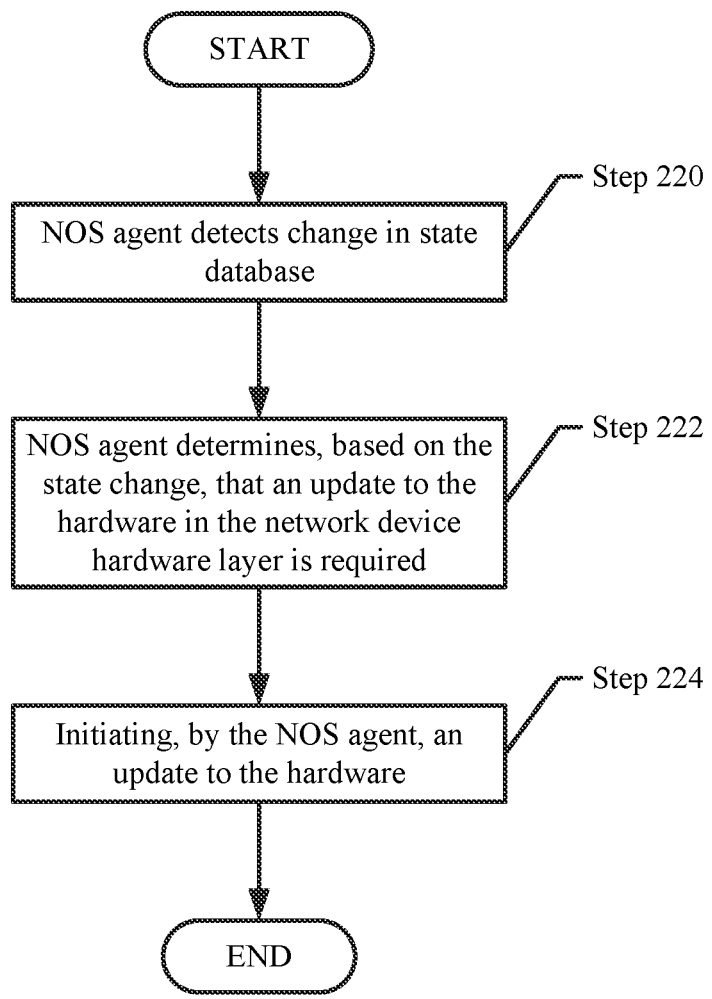
FIG. 2B shows a flowchart for a method for processing network device state changes from the perspective of a network operating system agent in accordance with one or more embodiments.

FIG. 2B shows a flowchart for a method for processing network device state changes in accordance with one or more embodiments described herein. The method of FIG. 2B may be performed by, for example, a NOS agent (e.g., 132, FIG. 1B). Other components illustrated in FIGS. 1A-1C may perform the method of FIG. 2B without departing from the disclosure. Further, one or more steps in FIG. 2B may be performed concurrently with one or more steps in FIGS. 2A-2B.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 220, a change in the state database (138, FIG. 1B) is detected. The change may be the addition of the network device state change stored in the state database in accordance with FIG. 2A. In one embodiment, one or more NOS agents are monitoring all or portions of the state database and, when a change is detected in the state database, one or more of the NOS agents performs one or more actions in response to the detection.

In step 222, an update to the hardware in the network device hardware layer is determined to be required. The network device state change may specify performing an update (and/or initiating any other process) on the hardware. As discussed above, the hardware may be one or more ASICs. The NOS agent, in response to detecting the change, determines that one or more processes to the ASIC(s) is to be performed.

In step 224, the update to hardware in the network device hardware layer is initiated. In one embodiment of the disclosure, the update includes sending commands to a hardware driver that initiates the commands in accordance with the update. The update may specify, for example, modifying the state of one or more ASICs.

While not described in FIGS. 2A-2B, additional processing may be performed in the network device. Specifically, after the state of the ASICs has been changed and/or updated in accordance with FIG. 2B, the state database may be updated to reflect the state change of the hardware. The interface agent, detecting the update to the state database, may translate any changes to the state database to the first format, and store (or initiate storage of) the translated state changes in the 3PNOS database.

Example

Figure 3:
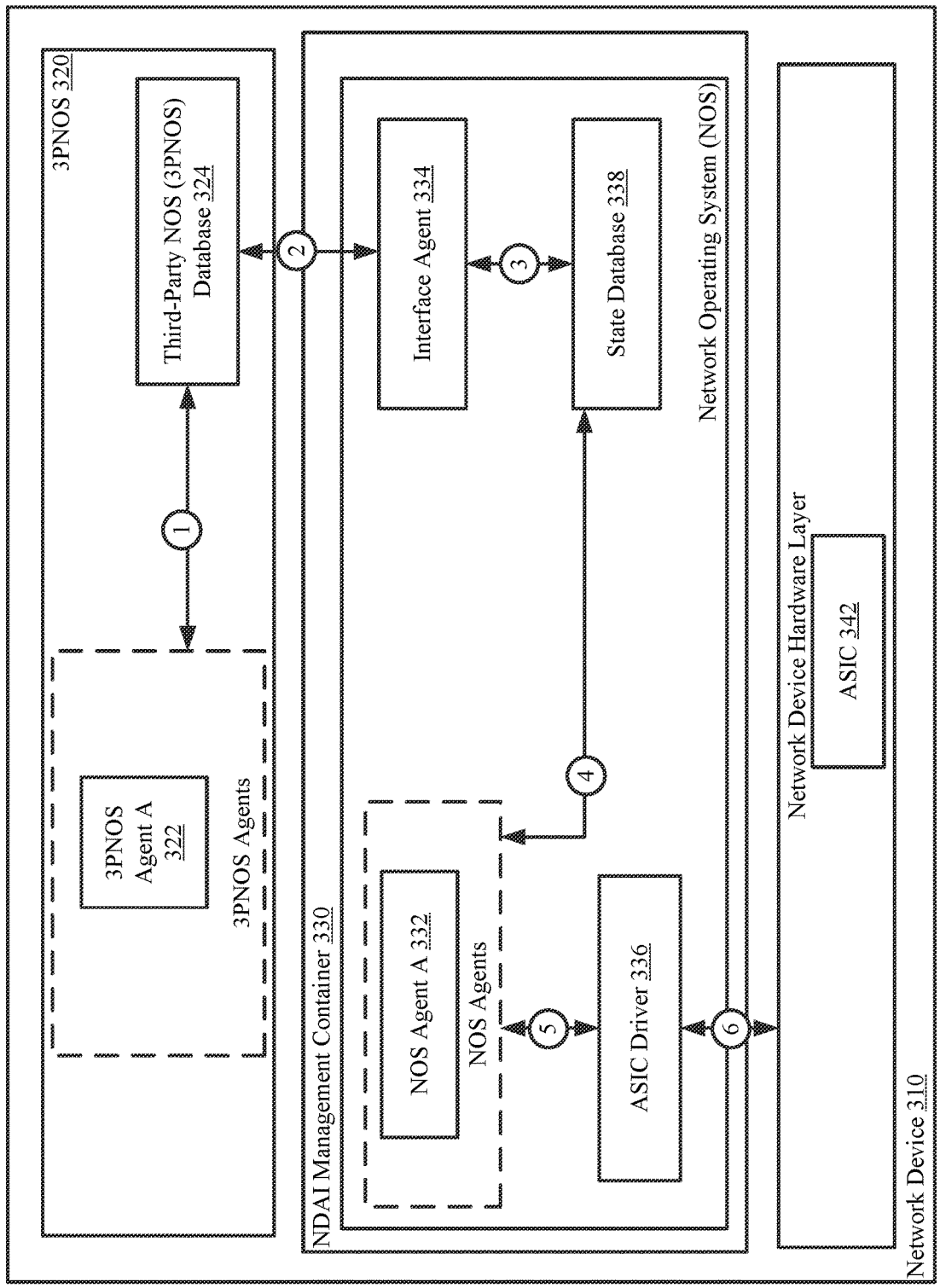
FIG. 3 shows an example in accordance with one or more embodiments described herein.

FIG. 3 show an example in accordance with one or more embodiments of the disclosure. The example is not intended to limit the disclosure. Turning to the example, consider a scenario in which an ASIC is to be programmed by a 3PNOS. A 3PNOS agent (322) sends a 3PNOS state change to be stored in the 3PNOS database (324) [1]. An interface agent (334), executing in a NDAI management container (330), is monitoring the 3PNOS database (324) and identifies the 3PNOS state change stored by the 3PNOS agent (322) [2]. The monitoring may be performed, e.g., in a periodic manner.

The interface agent (334) performs a translation as specified in FIG. 2A to obtain a network device state change. The network device state change is in a format readable by NOS agents operating in the NDAI management container (330) of the network device (310). The interface agent (334) stores the network device state change (which is now in the desired format) in a state database (338) in the network operating system [3]. A NOS agent (332) in the NDAI management container (330) reads the network device state change and determines that an update to an ASIC (342) is required [4]. The NOS agent (332), in response to the determination, initiates the update to the ASIC (342) via an ASIC driver (336) [5]. The ASIC driver (336) performs the update on the ASIC (342) [6].

End of Example

Figure 4:
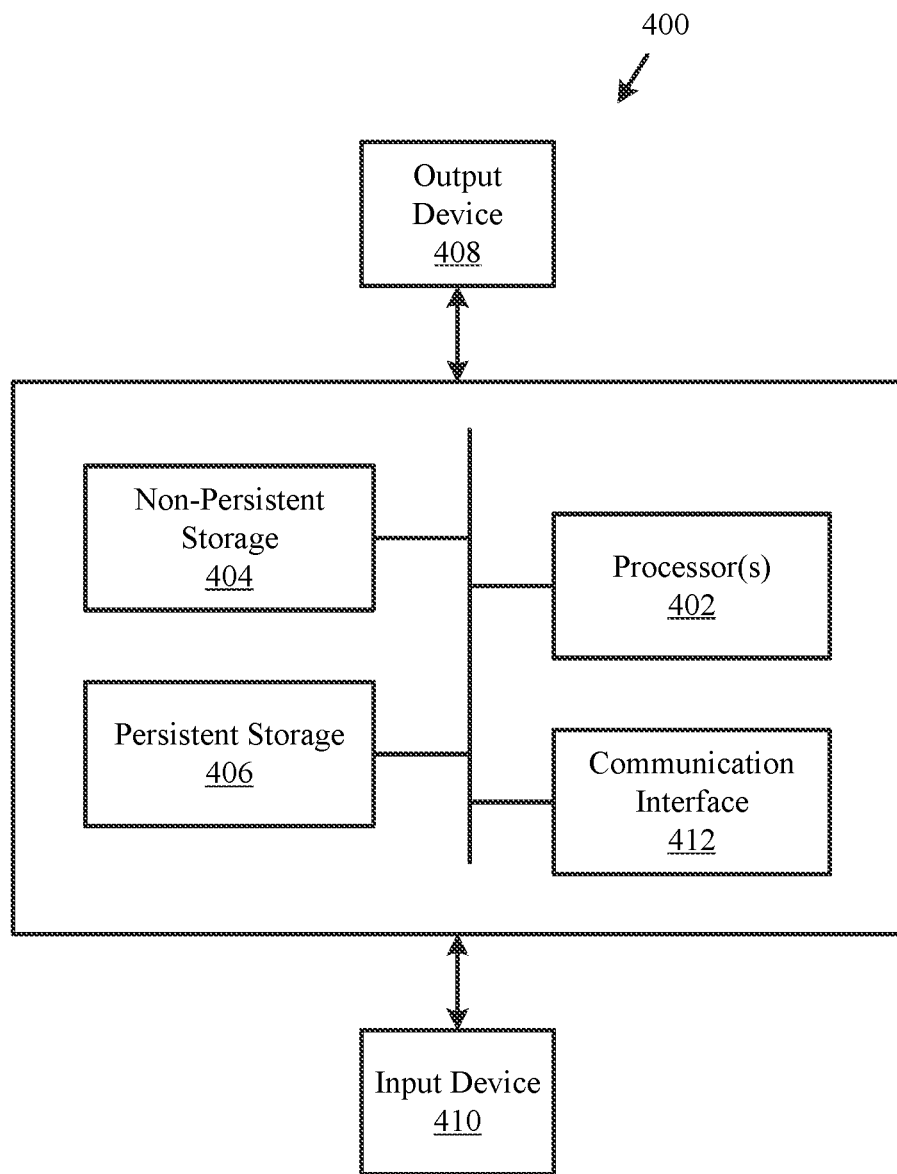
FIG. 4 shows a diagram of a computing device in accordance with one or more embodiments described herein.

As discussed above, embodiments of the disclosure may be implemented using computing devices. FIG. 4 shows a diagram of a computing device in accordance with one or more embodiments of the disclosure. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the disclosure, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the disclosure, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein allow for the operation of a third-party network operating system (3PNOS) to initiate hardware updates and/or other processes by introducing an intermediate layer in a network device that includes capability for translating state information in a first database in the 3PNOS to network device state information readable by NOS agents initiating the specified processes.

Further, embodiments of the disclosure reduce the requirement of tailoring each instance of the 3PNOS to be equipped to communicate with a network device equipped with the interface agent. In this manner, the 3PNOS may manage its own database with state changes stored in its own format.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network device on which a network operating system (NOS) and a third-party network operating system (3PNOS) are executing, the method comprising:
   detecting a 3PNOS state change in a 3PNOS database managed by the 3PNOS;
   translating the 3PNOS state change into a network device state change;
   obtaining, by the NOS, the network device state change;
   in response to the obtaining: initiating, by a NOS agent executing in the NOS, an update to hardware on the network device by the NOS,
   wherein the NOS executes in a network device abstract interface management container, and the NOS comprises an interface agent,
   wherein the 3PNOS is isolated from the NOS and interacts with the NOS through the interface agent, and
   wherein the translating the 3PNOS state change into the network device state change comprises converting the 3PNOS state change from a first format to the network device state change in a second format, and wherein the 3PNOS database stores the 3PNOS state change in the first format and the NOS agent utilizes the network device state change in the second format for the update.

2. The method of claim 1, wherein
   a 3PNOS agent executes on the 3PNOS to generate the 3PNOS state change, and
   the 3PNOS agent stores the 3PNOS state change in the 3PNOS database.

3. The method of claim 1, wherein the detecting the 3PNOS state change comprises monitoring the 3PNOS database by an interface agent executing in the NOS.

4. The method of claim 3, wherein the interface agent executes in a first container on the network device, and the NOS executes in a second container on the network device.

5. The method of claim 1, wherein the NOS executes in a container in the network device.

6. The method of claim 1, wherein the update modifies how the hardware processes packets received by the network device.

7. The method of claim 6, wherein the hardware comprises an application-specific integrated circuit (ASIC) or a field-programmable gate array (FPGA).

8. A network device on which a network operating system (NOS) and a third-party network operating system (3PNOS) are executing, comprising:
   a processor;
   a third-party network operating system (3PNOS) database; and
   memory comprising instructions which, when executed by the processor, perform a method comprising:
   detecting a 3PNOS state change in the 3PNOS database managed by the 3PNOS;
   translating the 3PNOS state change into a network device state change;
   storing the network device state change by the NOS;
   detecting the storing of the network device state change by the NOS agent executing in the NOS;
   initiating, in response to detecting the storing, an update to hardware on the network device by the NOS,
   wherein the NOS executes in a network device abstract interface management container, and the NOS comprises an interface agent, and
   wherein the 3PNOS is isolated from the NOS and interacts with the NOS through the interface agent, and
   wherein the translating the 3PNOS state change into the network device state change comprises converting the 3PNOS state change from a first format to the network device state change in a second format, and wherein the 3PNOS database stores the 3PNOS state change in the first format and the NOS utilizes the network device state change in the second format for the update.

9. The network device of claim 8, wherein:
   a 3PNOS agent executes on the 3PNOS to generate the 3PNOS state change, and
   the 3PNOS agent stores the 3PNOS state change in the 3PNOS database.

10. The network device of claim 8, wherein the detecting the 3PNOS state change comprises monitoring the 3PNOS database by an interface agent executing in the NOS.

11. The network device of claim 10, further comprising:
    a first container, wherein the interface agent executes in the first container on the network device,
    a second container, wherein the NOS executes in the second container on the network device.

12. The network device of claim 8, further comprising a container, wherein the NOS executes in the container.

13. The network device of claim 8, wherein the update modifies how the hardware processes packets received by the network devices.

14. The network device of claim 13, wherein the hardware comprises an application-specific integrated circuit (ASIC).

15. A method for managing a network device, the method comprising:
    concurrently executing a network operating system (NOS) and a third-party network operating system (3PNOS) on the network device;
    detecting a third-party network operating system (3PNOS) state change in a 3PNOS database managed by the 3PNOS;
    in response to the detecting, generating a network device state change by the network operating system (NOS), wherein the network device state change is based on the 3PNOS state change and comprises converting the 3PNOS state change from a first format to the network device state change in a second format; and using the network device state change, initiating an update to hardware on the network device by the NOS, wherein the 3PNOS database stores the 3PNOS state change in the first format and the NOS utilizes the network device state change in the second format for the update, wherein the 3PNOS does not directly manage the hardware, and wherein the 3PNOS is isolated from the NOS and interacts with the NOS through an interface agent.

16. The method of claim 15, wherein a 3PNOS agent executes on the 3PNOS to generate the 3PNOS state change, and the 3PNOS agent stores the 3PNOS state change in the 3PNOS database.

17. The method of claim 15, wherein the detecting the 3PNOS state change comprises monitoring the 3PNOS database by the NOS.

18. The method of claim 15, wherein the hardware comprises an application-specific integrated circuit (ASIC).

19. The method of claim 15, wherein the interface agent executes in a first container on the network device, and the NOS executes in a second container on the network device.

20. The method of claim 15, wherein the update modifies how the hardware processes packets received by the network device.

* * * * *